United States Patent
Kim (10) Patent No.: US 9,695,887 B2
(45) Date of Patent: Jul. 4, 2017

(54) DRY CLUTCH CONTROL METHOD FOR VEHICLE

(71) Applicants: Hyundai Motor Company, Seoul (KR); Kia Motors Corp., Seoul (KR)

(72) Inventor: Jin Sung Kim, Whasung-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 236 days.

(21) Appl. No.: 14/548,959

(22) Filed: Nov. 20, 2014

(65) Prior Publication Data
US 2016/0003312 A1 Jan. 7, 2016

(30) Foreign Application Priority Data
Jul. 4, 2014 (KR) .................. 10-2014-0083768

(51) Int. Cl.
*F16D 48/06* (2006.01)
(52) U.S. Cl.
CPC ...... *F16D 48/06* (2013.01); *F16D 2500/3067* (2013.01); *F16D 2500/30415* (2013.01); *F16D 2500/31* (2013.01); *F16D 2500/3108* (2013.01); *F16D 2500/3115* (2013.01); *F16D 2500/3144* (2013.01); *F16D 2500/50293* (2013.01); *F16D 2500/70436* (2013.01); *F16D 2500/7109* (2013.01)
(58) Field of Classification Search
CPC ...................................... F16D 48/06
See application file for complete search history.

(56) References Cited

U.S. PATENT DOCUMENTS

| 6,024,674 | A | 2/2000 | Sato et al. | |
| 2004/0260444 | A1* | 12/2004 | Winkelmann | F16D 48/06 701/67 |
| 2005/0189192 | A1* | 9/2005 | Serebrennikov | B60W 30/20 192/30 V |
| 2010/0228450 | A1* | 9/2010 | Takahashi | F16H 61/061 701/51 |

FOREIGN PATENT DOCUMENTS

| EP | 0 845 616 A2 | 6/1998 |
| JP | 2013-23141 A | 2/2013 |
| JP | 2013-24281 A | 2/2013 |
| KR | 10-2011-0049934 A | 5/2011 |
| KR | 10-2013-0055472 A | 5/2013 |

* cited by examiner

*Primary Examiner* — Jacob S Scott
(74) *Attorney, Agent, or Firm* — Morgan Lewis & Bockius LLP (57) ABSTRACT

Disclosed are dry clutch control method and apparatus for a vehicle. The method may include a reference speed generating step of generating a virtual target input shaft speed from a wheel speed, a vibration recognizing step of detecting a vibration component based on a difference between an actually measured input shaft speed and the virtual target input shaft speed, and a control input step of additionally applying an anti judder control input to a clutch control torque controlling a dry clutch connected to an input shaft. The anti judder control input may be applied to the vibration component recognized in the vibration recognizing step in a form of being continuously damped starting from an impulsive control input.

8 Claims, 6 Drawing Sheets

DRY CLUTCH CONTROL METHOD FOR VEHICLE

CROSS REFERENCE TO RELATED APPLICATION

The present application claims priority of Korean Patent Application Number 10-2014-0083768 filed Jul. 4, 2014, the entire contents of which application are incorporated herein for all purposes by this reference.

BACKGROUND OF INVENTION

Field of Invention

The present invention relates to a dry clutch control method for a vehicle, and more particularly, to a technology of coping with a generation of judder in a dry clutch used in an automated manual transmission (AMT) including a dual clutch transmission (DCT).

Description of Related Art

Recently, many attempts to develop a dual clutch transmission (DCT) capable of simultaneously achieving driving convenience of an automatic transmission and fuel efficiency and high power efficiency of a manual transmission have been conducted. The DCT is a kind of an automated manual transmission (AMT) based on a manual transmission system and has two torque transfer shafts to reduce and prevent a reduction of torque during transmission, thereby securing a quality of transmission and is a system automatically controlling a clutch without a torque converter to be able to increase fuel efficiency.

However, the DCT or the AMT directly fastens the clutch without the torque converter to switch power and therefore clutch control performance dominates launch and transmission performance of a vehicle.

As such, the clutch used in the DCT or the AMT is divided into a wet clutch controlled by an oil pressure and a dry clutch having a mechanical operating scheme of a simple configuration. In the general driving situations, it has been known that the dry clutch has power transfer efficiency 3% higher than the wet clutch and thus the dry clutch has been in the limelight as a fuel efficiency improvement technology.

However, when the dry clutch is overheated as in a case of starting of a vehicle at an uphill road, and the like, the clutch performance may be degraded due to a change in a friction coefficient or the occurrence of vibration of the dry clutch, or the like.

That is, a vibration phenomenon of the dry clutch in a specific slip section depending on a rotating speed difference between an engine flywheel and a clutch disk due to a high temperature situation of the dry clutch as described above and a weight or rigidity of a vehicle is referred to as a judder.

The hardware characteristics allow a driver to feel a longitudinal vibration of a vehicle to reduce drivability. To solve the above problem, a method of changing a material, and the like of a clutch disk has been used, but may have an effect on power transfer performance of a vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is intended to greatly improve drivability of a vehicle without additional costs or changing a weight of a vehicle by ruling out measures such as a change in a material of a clutch disk and effectively suppressing and removing a judder using a dry clutch control method when the judder occurs in the dry clutch.

According to various aspects of the present invention, there is provided a dry clutch control method for a vehicle, including: a reference speed generating step of generating a virtual target input shaft speed from a wheel speed; a vibration recognizing step of detecting a vibration component based on a difference between an actually measured input shaft speed and the virtual target input shaft speed; a control input step of additionally applying as an anti judder control input a clutch control torque controlling a dry clutch connected to an input shaft, in which the anti judder control input is applied to the vibration component recognized in the vibration recognizing step in a form of being continuously damped starting from an impulsive control input.

According to various other aspects of the present invention, there is provided a dry clutch control apparatus for a vehicle, including: a vibration component extractor configured to generate a virtual target input shaft speed from a wheel speed and detect a vibration component based on a difference between an actually measured input shaft speed and the virtual target input shaft speed; and a feedback controller configured to additionally apply an anti judder control input to a clutch control torque controlling a dry clutch connected to an input shaft, in which the anti judder control input is applied to the vibration component recognized in the vibration component extractor in the form of being continuously damped starting from an impulsive control input.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
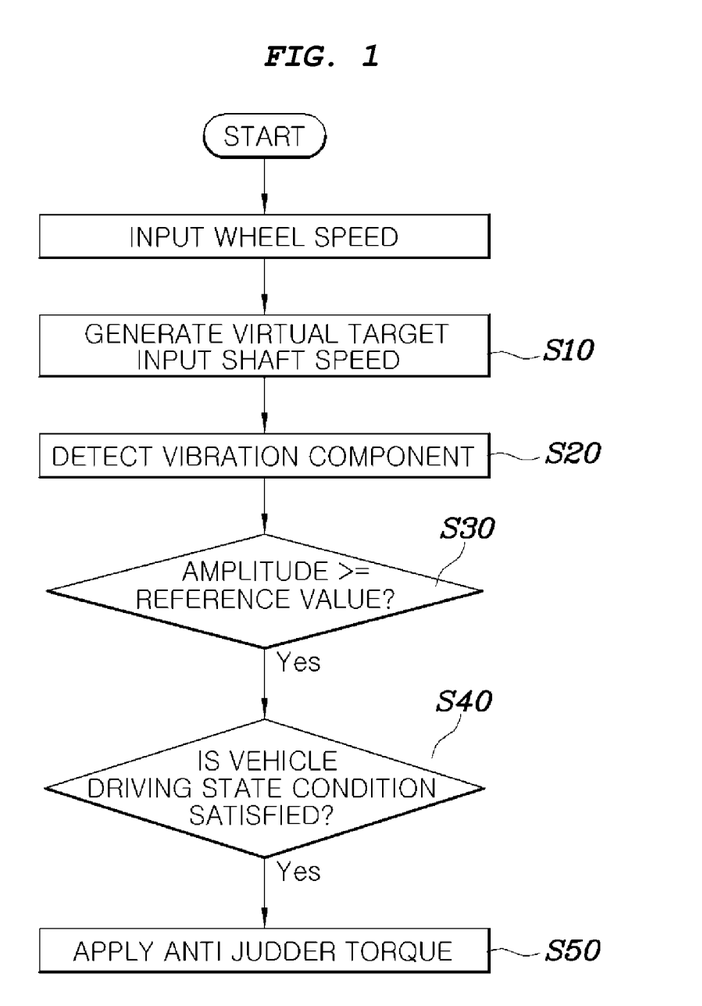
FIG. 1 is a flow chart illustrating an exemplary dry clutch control method according to the present invention.

Referring to FIG. 1, a dry clutch control method for a vehicle according to various embodiments of the present invention includes: a reference speed generating step (S10) of generating a virtual target input shaft speed from a wheel speed; a vibration recognizing step (S20) of detecting a vibration component based on a difference between an actually measured input shaft speed and the virtual target input shaft speed; and a control input step (S50) of additionally applying an anti judder control input to a clutch control torque controlling a dry clutch connected to the input shaft, in which the anti judder control input is applied to the vibration component recognized in the vibration recognizing step (S20) in a form of being continuously damped starting from an impulsive control input.

In the reference speed generating step (S10), the input shaft speed associated with current driving is calculated by multiplying a current transmission gear ratio by a final reduction ratio by receiving a wheel speed of a vehicle and then the calculated input shaft speed is processed by a high pass filter, thereby obtaining the virtual target input shaft speed.

That is, the input shaft speed (in the case of the DCT, since the input shaft is two) providing power through the current wheel is calculated by multiplying the transmission gear ratio and the final reduction ratio of a currently meshed shift gear by a speed signal input from a wheel speed sensor of a vehicle and then the calculated signal is processed by the high pass filter to remove a drift and obtain the virtual target input shaft speed as a reference of the stabilized input shaft speed.

In the vibration recognizing step (S20), the vibration component of the dry clutch to which the input shaft is connected is extracted by obtaining the difference between the virtual target input shaft speed obtained as described herein and the input shaft speed currently actually measured.

Figure 2:
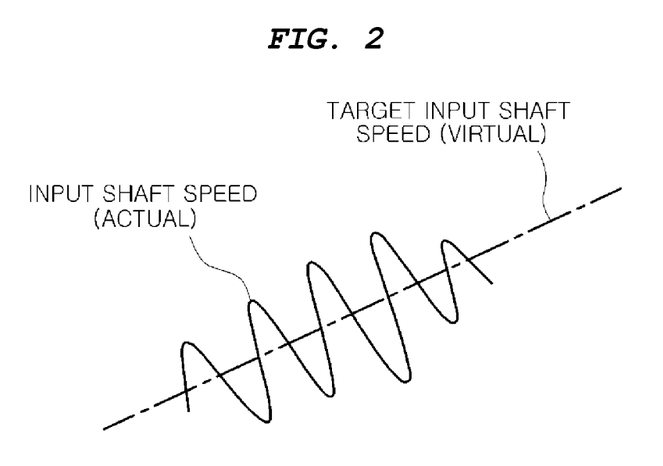
FIG. 2 is a comparison diagram of the virtual target input shaft speed with the actually measured input shaft speed according to an exemplary embodiment of the present invention.

For reference, FIG. 2 is a comparison diagram of the virtual target input shaft speed with the actually measured input shaft speed.

The anti judder control input applied in the control input step (S50) is determined by a differential equation over time as the following Equation:

$$\dot{T}_{AJ} = -\sigma T_{AJ} + \lambda |\omega_i - \omega_{id}|$$

In the above Equation, $T_{AJ}$ represents an anti judder control torque, $\sigma$ represents a constant determining a damping speed of the anti judder control torque, $\lambda$ represents an impulse magnitude of the anti judder control torque, $\omega_i$ represents the actually measured input shaft speed, $\omega_{id}$ represents the virtual target input shaft speed.

That is, as the vehicle starts from a stop state by an operation of an accelerator pedal, a launch control to make a clutch follow up RPM of an engine is performed. In this case, a clutch actuator for operating the clutch is input with the clutch control torque for basically performing the launch control. In this situation, when the judder occurs in the clutch, it is determined that the control input step (S50) needs to be performed through the reference speed generating step (S10) and the vibration recognizing step (S20) and in the control input step (S50), the anti judder torque is additionally applied to the clutch control torque basically provided. In this case, the anti judder torque is applied to the clutch in the form of applying the impulsive control torque to the amplitude of the vibration to be controlled as described herein and then being gradually damped continuously.

As such, the reason of applying the anti judder torque in the form of applying the impulsive control torque and then being gradually damped continuously, to the amplitude of the clutch vibration component is to consider the following matters.

That is, in the case of performing a feedback control on the anti judder torque in a direction to simply offset the corresponding amplitude of the vibration component occurring due to the clutch judder, the clutch vibration may be rather caused due to a response delay of the clutch actuator, and the like and in the case of simply applying the impulsive anti judder torque, when the judder is vibrated and a phase difference instantly occurs, an error may be caused. Therefore, according to various embodiments of the present invention, the problems caused due to the response delay of the clutch actuator, and the like are solved by applying the impulsive anti judder torque to the vibration of the judder and then continuously damping the anti judder torque.

Figure 3A:
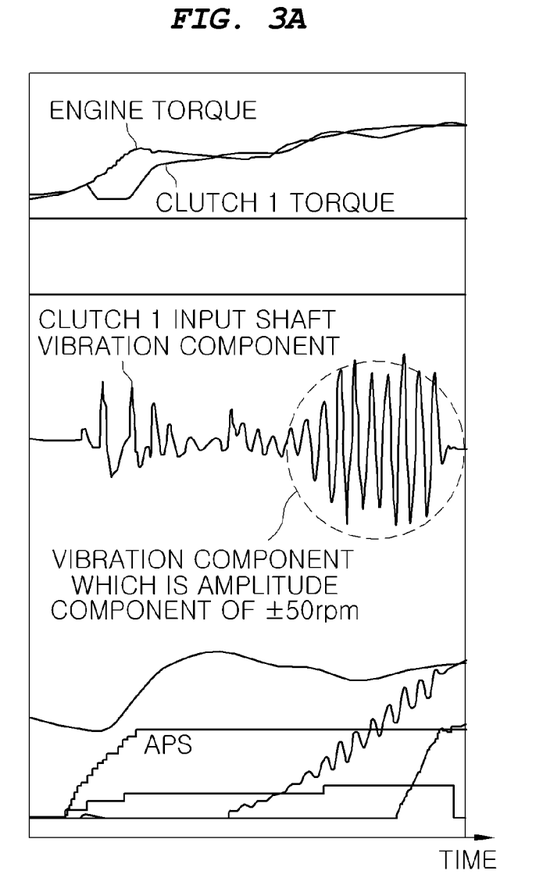
FIG. 3A and FIG. 3B are diagrams for describing an effect of reducing clutch judder depending on whether the present invention is applied, as a test result of a vehicle equipped with a DCT.
Figure 3B:
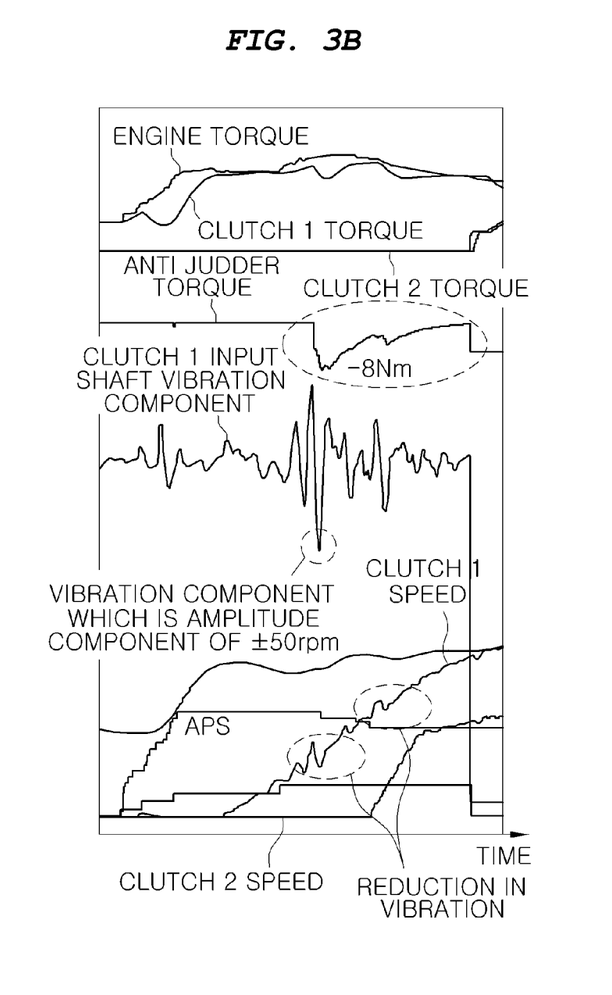

FIG. 3A and FIG. 3B are diagrams illustrating a test result of a vehicle equipped with the DCT including clutch 1 and clutch 2 which are the dry clutch, in which FIG. 3A illustrates the case in which the present invention is not applied to the occurrence situation of the judder at the time of launching of the vehicle by stepping on the accelerator pedal and FIG. 3B illustrates the case in which the present invention is applied to the occurrence situation of the judder at the time of launching of the vehicle by stepping on the accelerator pedal.

In the case in which the present invention is not applied, the judder state seriously vibrated up and down is shown while a speed of the clutch 1 is increased in proportion to the engine speed depending on the operation of the accelerator pedal represented by APS and in the case in which the present invention is applied, it may be confirmed that the anti judder torque is applied in the same condition and thus the vibration due to the judder of the clutch 1 is remarkably reduced.

In some embodiments, a vibration state determining step (S30) of limiting the control input step (S50) to be performed only when the amplitude of the vibration component recognized in the vibration recognizing step (S20) is equal to or more than a predetermined reference value is further included between the vibration recognizing step (S20) and the control input step (S50).

The vibration state determining step (S30) is to apply the control of the present invention only in the condition in which there is a need to positively reduce the vibration due to the judder, in which the predetermined reference value is a value not to perform the control input step (S50) in the case of the judder of a level which is not recognized by a driver and perform the control input step (S50) in the case of the judder of a level which needs to be positively reduced by the control of the present invention and is a value which may be appropriately selected by multiple experiments, and the like.

In some embodiments, a driving state determining step (S40) of determining whether the control input step (S50) starts according to a driving state of a vehicle is further included between the vibration state determining step (S30) and the control input step (S50) and it is determined whether the driving state of the vehicle determined in the driving state determining step (S40) is an launch state from a stop state of a vehicle and in the case of the launch state from the stop state of the vehicle, the control input step (S50) is performed.

That is, in some embodiments, the present invention includes the driving state determining step (S40) to apply the control input step (S50) of the present invention only to the launch state of the vehicle. This is to apply the present invention only to the case in which the clutch judder which is a main problem at the time of driving a vehicle occurs at the time of launching from the stop state of the vehicle and not to apply the present invention in the case in which the entering and ending of the launch are repeated.

In detail, a method for determining whether the vehicle is in the launch state from the stop state understands the case in which the input shaft speed at the time of starting the launch is less than a predetermined set value as the launch state from the stop state. That is, the case in which the launch control is performed starting from a vehicle speed (input shaft speed) of approximately 0 is understood as the launch from the stop state. Therefore, the set value may be set to be a value representing the vehicle speed of approximately 0.

In some embodiments, the driving state of the vehicle determined in the driving state determining step (S40) may be configured to further include the following driving state. That is, the driving state which may be additionally considered may include: a vehicle speed state representing whether it is in a range in which the judder of the clutch may occur in the case in which the vehicle speed exceeds a predetermined level; a slip state representing whether it is in a range in which the judder of the clutch may occur in the case in which a slip of the clutch is less than a predetermined level; an engine speed change state representing whether the engine is in a normal state in the case in which the change in the engine speed is in a predetermined range; and an engine speed state representing whether the engine speed is larger than an idle speed of the engine.

Reviewing the foregoing driving states, when the vehicle speed state is in the range in which the judder of the clutch may occur, the slip of the clutch is in the range in which the judder of the clutch may occur, the engine speed change represents that the engine is in the normal state, and the engine speed is larger than the idle speed of the engine, the control input step (S50) is performed.

In detail, the vehicle speed state determines whether the input shaft speed associated with the current driving is equal to or more than the predetermined set value to determine whether it is in the range in which the judder of the clutch may occur. This is not to apply the present invention in the state in which the vehicle speed is too low which is difficult to be differentiated from the stop state and apply the present invention only in the range of the vehicle speed of the level in which the clutch judder may occur due to the vehicle speed increased to some degree, in which to meet the purport, the set value is set to be a value between a region in which the judder does not occur and a region in which the judder starts to occur by the experiment and analysis.

The slip state considers in which region the slip speed which is the difference of the rotating speed between the input shaft speed associated with the current driving and the engine speed is present and when the slip speed is too large, the judder does not occur but tends to occur in a range of about 400 to 800 RPM, such that the control input step (S50) may be performed only in the case in which the slip speed is in a range of, for example, 300 to 900 RPM.

In connection with condition for the change in the engine speed to represent whether the engine is in the normal state, a transition section in which the engine speed is suddenly changed by the operation of the accelerator pedal is ruled out and in the normal state in which the change in the engine speed is not too large, the judder frequently occurs, such that the control input step (S50) is performed. In connection with the detailed determination on whether the control input step (S50) is performed, when an engine speed variation is smaller than the set value, it is determined that the engine is in the normal state, in which to meet the purport, the set value may be set to be a level which may confirm whether the engine is in a normal state based on the experiment, and the like.

Further, the reason of determining whether the engine speed is larger than the idle speed of the engine is to prevent the engine from stalling when the control input step (S50) is performed in the state in which the engine speed is equal to or less than the idle speed.

In some embodiments, the driving state of the vehicle determined in the driving state determining step (S40) further includes the repetition number of an operation of stepping on and off the accelerator pedal by a driver within a predetermined time and thus when the operation of stepping on and off the accelerator pedal within the predetermined time is repeated, the control input step (S50) may not be performed.

When a so-called tip in/out operation of continuously stepping on and off the accelerator pedal by a driver is repeated, the launch sense of the vehicle may be more improved by not applying the judder prevention control of the present invention.

Therefore, the controller performing the present invention counts the tip in/out operation according to the operation of the accelerator pedal of the driver to perform the control input step (S50) only when the value is, for example, 0 and the count performs a routine initializing the value to 0 when the predetermined time elapses, such that the present invention is not applied when the driver repeatedly operates the accelerator pedal within a short period of time.

Therefore, a predetermined time to initialize the count may be appropriately set by multiple experiments, and the like about whether it is preferable to apply the present invention to the operation of the accelerator pedal repeatedly performed within a certain time.

Meanwhile, among the driving states of the vehicle, when the vehicle speed state, the slip state, and the engine speed state deviate from the condition to perform the control input step (S50) or when the driver's foot steps off the accelerator pedal, stopping the performance of the control input step (S50) may meet the purports for each state as described herein.

Figure 4:
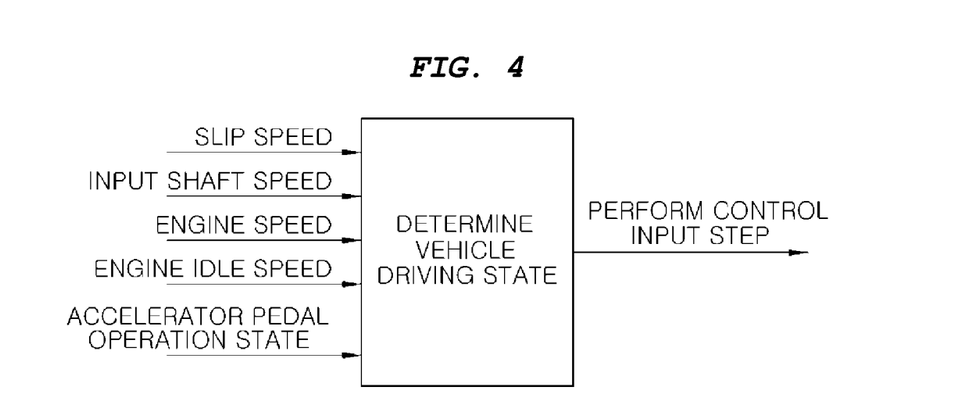
FIG. 4 is a diagram schematically illustrating an exemplary process of considering driving state conditions of a vehicle according to the present invention.

The determination on whether the control input step (S50) is performed according to the driving states of the vehicle may be schematically represented as illustrated in FIG. 4.

Figure 5:
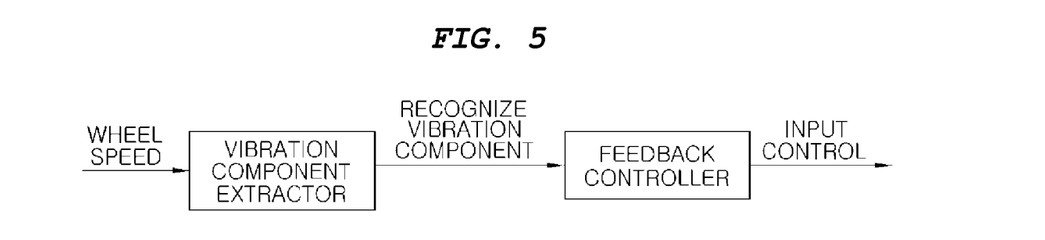
FIG. 5 is a block diagram illustrating a configuration of an exemplary dry clutch control apparatus for a vehicle according to the present invention.
Figure 6:
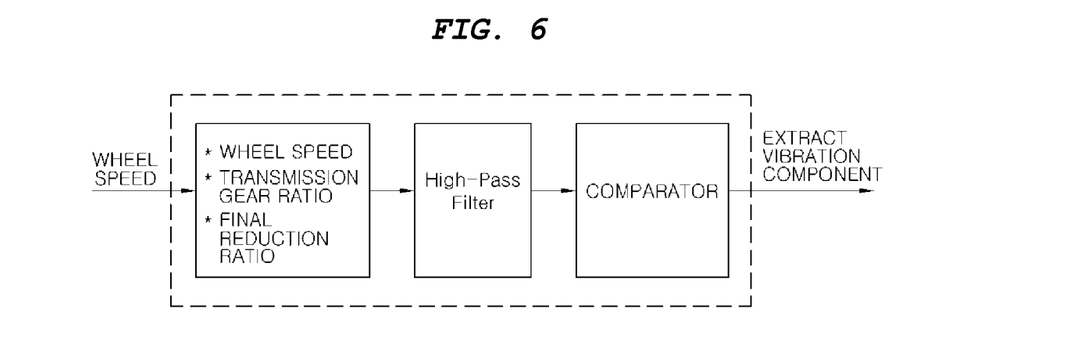
FIG. 6 is a diagram illustrating a configuration of an exemplary vibration component extractor of FIG. 5.

Meanwhile, the control method according to various embodiments of the present invention as described herein may be implemented by the following control apparatus. As illustrated in FIGS. 5 and 6, the control apparatus according to various embodiments of the present invention includes: a vibration component extractor configured to generate the virtual target input shaft speed from the wheel speed and detect the vibration component based on the difference between the actually measured input shaft speed and the virtual target input shaft speed; and a feedback controller configured to additionally apply the anti judder control input to the clutch control torque controlling the dry clutch connected to the input shaft, in which the anti judder control input is applied to the vibration component recognized in the vibration component extractor in the form of being continuously damped starting from the impulsive control input.

As illustrated in FIG. 6, the vibration component extractor includes: an integration part configured to obtain the rotating speed of the input shaft associated with the current driving by multiplying the transmission gear ratio and the final reduction ratio by the wheel speed; a high pass filter configured to process the rotating speed of the input shaft obtained as described herein; and a comparator configured to extract the vibration component based on the difference between the actually measured input shaft speed and the virtual target input shaft speed output from the high pass filter.

Figure 7A:
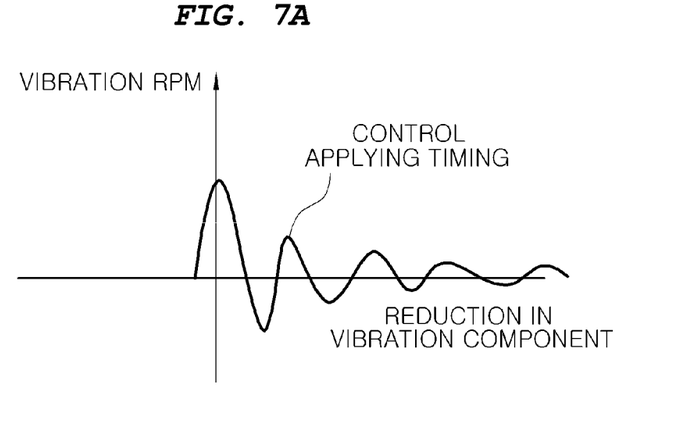
FIG. 7A and FIG. 7B are graphs illustrating a principle of applying an anti judder torque in an exemplary feedback controller of FIG. 5.
Figure 7B:
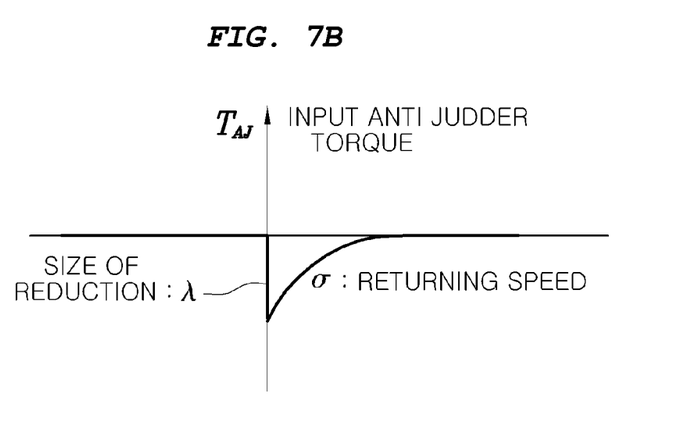

The feedback controller determines and applies the anti judder control input by the differential equation for the time only when the amplitude of the vibration component input from the vibration component extractor is equal to or more than the predetermined reference value to first input the impulsive anti judder torque to the amplitude of the judder vibration to be controlled and then gradually damp the anti judder torque as in the graphs conceptually illustrated in FIG. 7A and FIG. 7B, thereby gradually reducing the vibration component with the passage of time.

As described herein, according to various embodiments of the present invention, it is possible to greatly improve the drivability of a vehicle without additional costs or changing a weight of a vehicle by ruling out measures such as a change in a material of the clutch disk and effectively suppressing and removing the judder using the dry clutch control method when the judder occurs in the dry clutch.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dry clutch control method for a vehicle, comprising:
a reference speed generating step of generating a virtual target input shaft speed from a wheel speed;
a vibration recognizing step of detecting a vibration component based on a difference between an actually measured input shaft speed and the virtual target input shaft speed;
a control input step of additionally applying an anti judder control input to a clutch control torque controlling a dry clutch connected to an input shaft, in which the anti judder control input is applied to the vibration component recognized in the vibration recognizing step in a form of being continuously damped starting from an impulsive control input,
wherein the anti judder control input applied in the control input step is determined by a differential equation over time:

$$\dot{T}_{AJ} = -\sigma T_{AJ} + \lambda |\omega_i - \omega_{id}|$$

wherein $T_{AJ}$ represents an anti judder control torque,
σ represents a constant determining a damping speed of the anti judder control torque,
λ represents an impulse magnitude of the anti judder control torque,
$\omega_i$ represents the actually measured in input shaft speed, and
$\omega_{id}$ represents the virtual target input shaft speed.

2. The dry clutch control method for a vehicle of claim 1, further comprising:
a vibration state determining step of limiting the control input step to be performed only if an amplitude of the vibration component recognized in the vibration recognizing step is equal to or more than a predetermined reference value, wherein the vibration state determining step is performed between the vibration recognizing step and the control input step.

3. The dry clutch control method for a vehicle of claim 2, further comprising:
a driving state determining step of determining a driving state of the vehicle, wherein
the driving state determining step is performed between the vibration state determining step and the control input step, and
the control input step is performed if the driving state of the vehicle determined in the driving state determining step is an launch state from a stop state of the vehicle.

4. The dry clutch control method for a vehicle of claim 3, wherein the driving state of the vehicle determined in the driving state determining step includes:
a vehicle speed state representing whether it is in a range in which the judder of the clutch occurs in a case in which a vehicle speed exceeds a predetermined level;
a slip state representing whether it is in a range in which the judder of the clutch occurs in a case in which a slip of the clutch is less than a predetermined level;
an engine speed change state representing whether the engine is in a normal state in a case in which a change in the engine speed is in a predetermined range; and
an engine speed state representing whether the engine speed is higher than an idle speed of the engine,
wherein when the vehicle speed state is in the range in which the judder of the clutch occurs, the slip of the clutch is in the range in which the judder of the clutch occurs, the engine is in the normal state, and the engine speed is higher than the idle speed of the engine, the control input step is performed.

5. The dry clutch control method for a vehicle of claim 4, wherein the driving state of the vehicle determined in the driving state determining step further includes:
a repetition number of an operation of stepping on and off an accelerator pedal by a driver within a predetermined time,
wherein the control input step is not performed if the operation of stepping on and off the accelerator pedal is repeated within the predetermined time.

6. The dry clutch control method for a vehicle of claim 5, wherein when the vehicle speed state, the slip state, and the engine speed state deviate from a condition to perform the control input step or when the driver steps off the accelerator pedal, performance of the control input step stops.

7. A dry clutch control apparatus for a vehicle, comprising:
a vibration component extractor configured to generate a virtual target input shaft speed from a wheel speed and detect a vibration component based on a difference between an actually measured input shaft speed and the virtual target input shaft speed; and a feedback controller configured to additionally apply an anti judder control input to a clutch control torque controlling a dry clutch connected to an input shaft, in which the anti judder control input is applied to the vibration component recognized in the vibration component extractor in a form of being continuously damped starting from an impulsive control input, wherein the vibration component extractor includes:

an integration part configured to obtain a rotating speed of the input shaft associated with current driving by multiplying a transmission gear ratio and a final reduction ratio by the wheel speed;

a high pass filter configured to process the obtained rotating speed of the input shaft; and a comparator configured to extract the vibration component based on the difference between the actually measured input shaft speed and the virtual target input shaft speed output from the high pass filter.

8. The dry clutch control apparatus for a vehicle of claim 7, wherein the feedback controller determines and applies the anti judder control input by a differential equation over time only when an amplitude of the vibration component input from the vibration component extractor is equal to or more than a predetermined reference value, wherein the differential equation is:

$$\dot{T}_{AJ} = -\sigma T_{AJ} + \lambda |\omega_i - \omega_{id}|$$

wherein $T_{AJ}$ represents an anti judder control torque, $\sigma$ represents a constant determining a damping speed of the anti judder control torque, $\lambda$ represents an impulse magnitude of the anti judder control torque, $\omega_i$ represents the actually measured input shaft speed, and $\omega_{id}$ represents the virtual target input shaft speed.

* * * * *